(12) United States Patent
Kawamoto et al.

(10) Patent No.: US 7,572,075 B2
(45) Date of Patent: Aug. 11, 2009

(54) SHUTTER APPARATUS

(75) Inventors: Hisashi Kawamoto, Chiba (JP); Kazuya Shioda, Chiba (JP)

(73) Assignee: Seiko Precision Inc., Chiba (JP)

( * ) Notice: Subject to any disclaimer, the term of this patent is extended or adjusted under 35 U.S.C. 154(b) by 49 days.

(21) Appl. No.: 11/443,685

(22) Filed: May 30, 2006

(65) Prior Publication Data

US 2006/0250903 A1 Nov. 9, 2006

Related U.S. Application Data (63) Continuation of application No. PCT/JP2004/017475, filed on Nov. 25, 2004.

(30) Foreign Application Priority Data

Dec. 1, 2003 (JP) .............. 2003-401760

(51) Int. Cl.
    *H04B 1/20* (2006.01)
(52) U.S. Cl. .................................... 396/497
(58) Field of Classification Search .............. None
    See application file for complete search history.

(56) References Cited

U.S. PATENT DOCUMENTS 3,873,987 A * 3/1975 Brauning et al. ............ 396/242

| | | | |
|---|---|---|---|
| 6,466,524 B1 * | 10/2002 | Fujimoto | 369/30.85 |
| 6,789,261 B2 * | 9/2004 | Oishi | 720/719 |
| 2004/0052167 A1 * | 3/2004 | Tsutsumi et al. | 369/30.36 |
| 2004/0218481 A1 * | 11/2004 | Makisaka et al. | 369/30.48 |
| 2005/0094505 A1 * | 5/2005 | Kanazawa | 369/44.19 |

FOREIGN PATENT DOCUMENTS

| | | |
|---|---|---|
| JP | 5-127220 | 5/1993 |
| JP | 11-167141 | 6/1999 |
| JP | 2002-162666 | 6/2002 |
| JP | 2003-177447 | 6/2003 |

OTHER PUBLICATIONS

JP 111167141 Kantani Masashi Jun. 1999 Diaphragm and Shutter device English Translation.*
JP 2002-162666 Watabe Nobuaki Jun. 2002 Shutter device-English Translation.*
International Search Report for PCT/JP2004/017475, dated Dec. 28, 2004.

* cited by examiner

*Primary Examiner*—Wayne R Young
*Assistant Examiner*—Van N Chow
(74) *Attorney, Agent, or Firm*—Michaud-Duffy Group LLP (57) ABSTRACT

There is provided a shutter apparatus including a substrate having a shutter opening and at lease two sectors that are supported by spindles swingably and that open and close the shutter opening, and a spindle of one sector of the at lease two sectors is located in a swinging range of another sector of the at lease two sectors, and is a pin of a rod-shaped member formed on the substrate to be lower in an overall height than a height in which the another sector swings.

2 Claims, 7 Drawing Sheets

FULL OPEN

FIG. 1

FULL OPEN

SMALL APERTURE

SHUTTER APPARATUS

CROSS-REFERENCE TO RELATED APPLICATIONS

This application is a continuation of and claims priority to International Patent Application No. PCT/JP2004/017475 filed on Nov. 25, 2005, which claims priority to Japanese Patent Application No. 2003-401760 filed on Dec. 1, 2003, subject matter of these patent documents is incorporated by reference herein in its entirety.

BACKGROUND OF THE INVENTION

1. Field of the Invention

This invention generally relates to shutter apparatuses for use in optical apparatuses, and more particularly, to a shutter apparatus suitable for use in an optical apparatus such as a digital camera, camcorder, or the like.

2. Description of the Related Art

In recent years, as a shutter apparatus incorporated into a digital camera or the like has been downsized, a shutter speed has been increased. For instance, Japanese Patent Application Publication No. 2002-162666 (hereinafter, referred to as Patent Document 1) discloses the shutter apparatus of this type. The shutter apparatus disclosed in Patent Document 1 includes two shutter blades that open and close by the swing of an opening portion for exposure. The shatter blades respectively have connecting openings, into which a driving pin that reciprocates is inserted. As the driving pin moves, the shutter blade operates to open and close the opening portion. In the above-described connecting opening, there are provided a closing-side inner margin and an opening-side inner margin, whereas the driving pin is engaged in the closing-side inner margin at a closing operation and engaged in the opening-side inner margin at an opening operation. Also, in the closing-side inner margin, there is formed a backward inner margin that moves backward in an opposite direction from a closing direction.

It is configured in such a manner that the shutter opening can be closed at high speed by providing the backward inner margin as described above. Also, an allowance space W is arranged between the above-described closing-side inner margin and the opening-side inner margin so that the driving pin can move freely. The allowance width W decreases the load at the beginning of the movement of the driving pin, and the shutter blades perform a closing operation after the driving pin is sufficiently accelerated. In the shutter apparatus described in Patent Document 1 as stated, the shutter speed is increased and the shutter apparatus is downsized by providing the backward inner margin and the allowance width W.

Figure 8:
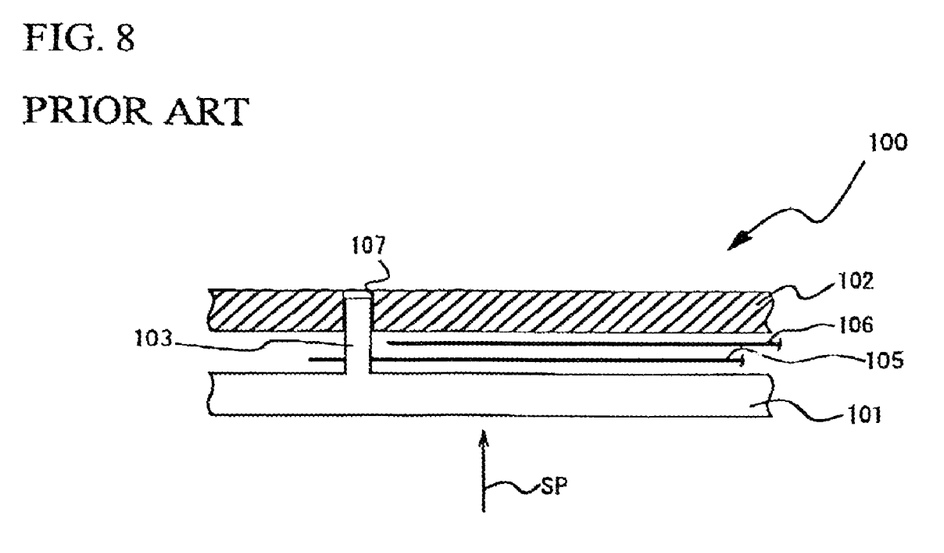
FIG. 8 is an enlarged side view illustrating the spindle of the sector and periphery thereof in a commonly used shutter apparatus.

The shutter apparatus disclosed in Patent Document 1, however, has a spindle of each sector serving as a center of swing is located in a place that does not interfere with the other sector. That is to say, each sector spindle is provided not to overlap a stopping place or a passing place of the other sector. FIG. 8 is an enlarged side view of a spindle (also known as Dübel) of a first sector 105 and periphery thereof in a commonly used shutter apparatus 100. A spindle 103 is integrally formed with a substrate 101 in a state of extruding from the substrate surface. A head side of the spindle 103 is inserted into a hole 107 provided in a supporting plate 102. The spindle 103 is fixed on a given position in the afore-described configuration. The first sector 105 is configured to swing around the spindle 103.

In order to downsize the shutter apparatus 100, it is preferable that the spindle 103 be arranged in a place of an arrow SP shown in FIG. 8. However, a second sector 106 swindles in this place, and thereby, it is impossible to locate the spindle 103. Accordingly, as shown in FIG. 8, the spindle 103 of the first sector 105 is conventionally provided in a place that avoids a region of interfering with the second sector 106. Here, only the spindle 103 of the first sector 105 is shown in FIG. 8, yet the spindle of the second sector 106 is also arranged in a place that avoids interfering with the first sector 105.

As described, in a conventional shutter apparatus, the spindle of one sector is arranged not to interfere with that of the other sector. Consequently, there is a problem in the conventional shutter apparatus in that a sector location is limited in order to avoid interfering with the other sector, even if there is a place where the spindle would like to be located in view of downsizing the shutter apparatus and assembling efficiency thereof.

SUMMARY OF THE INVENTION

It is therefore an object of the present invention to address the above problem and provide a shutter apparatus in which flexibility of the sector location is improved.

The above object can be realized by a shutter apparatus including a substrate having a shutter opening and at lease two sectors that are supported by spindles swingably and that open and close the shutter opening, wherein a spindle of one sector of the at lease two sectors is located in a swinging range of another sector of the at lease two sectors, and is a pin of a rod-shaped member formed on the substrate to be lower in an overall height than a height in which the another sector swings. Accordingly, it is possible to manufacture the shutter apparatus having the sectors located for purposes of increased shutter speed, downsizing, and assembling efficiency. The above-described pin is low in the overall height and does not disturb the swinging operation of another sector, thereby enabling the pin to be located without limitation.

An optical apparatus having the above-described shutter apparatus can be formed for purposes of downsizing and reducing the cost.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
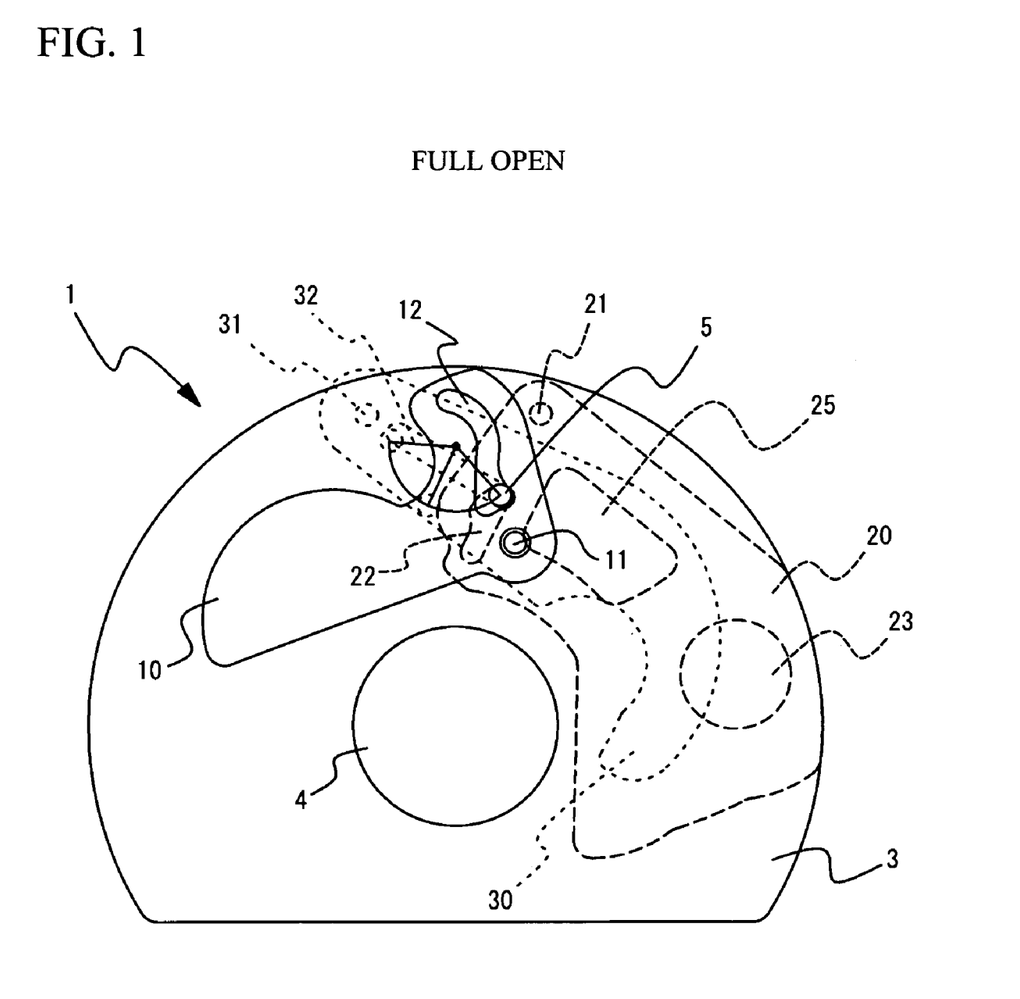
FIG. 1 is a view illustrating a shutter apparatus 1 in a fully open state.
Figure 3:
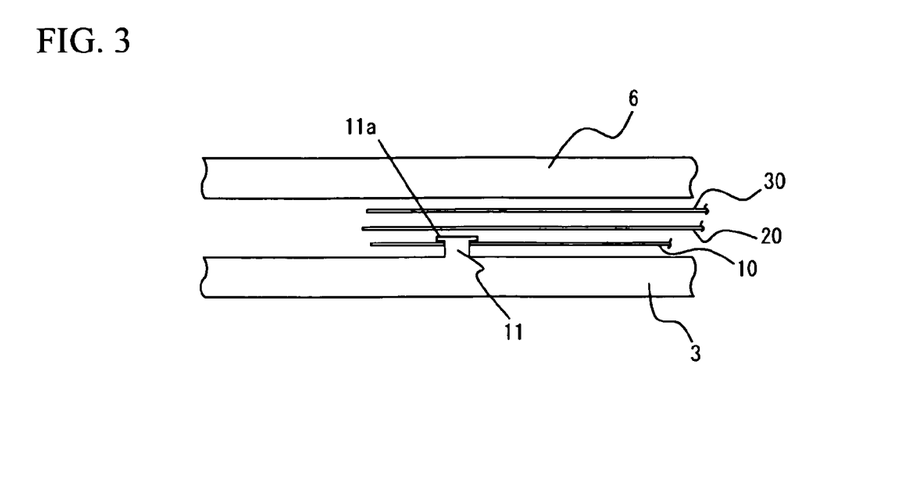
FIG. 3 is a view showing the relationship between a spindle of a first sector (one sector) and other sectors (another sector) in the shutter apparatus shown in FIG. 1.
Figure 4:
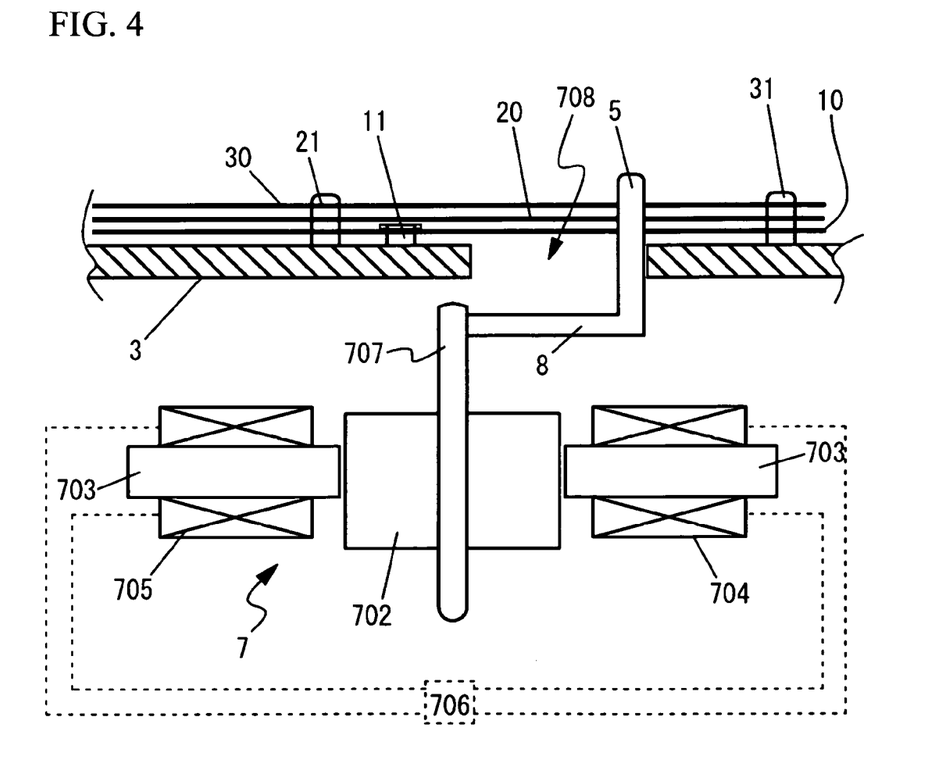
FIG. 4 is a plan view showing a positional relationship between a shutter substrate and a motor in the shutter apparatus 1.
Figure 5:
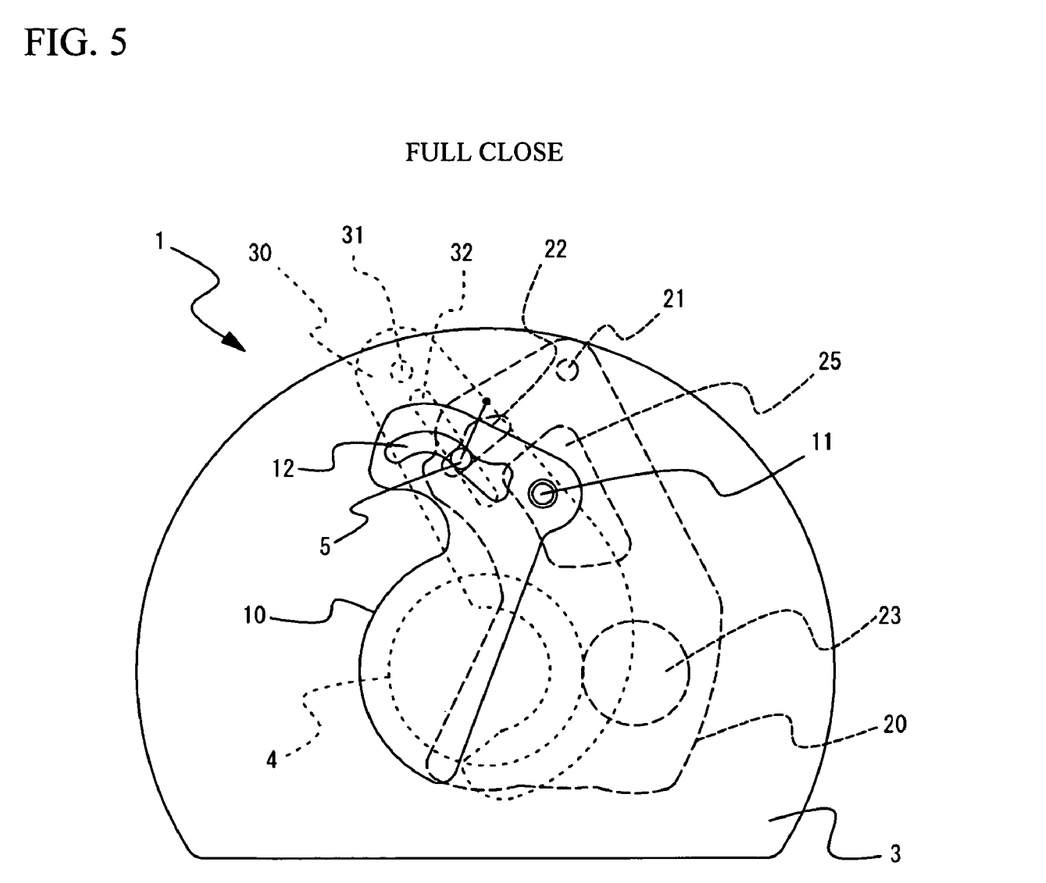
FIG. 5 is a view illustrating the shutter apparatus 1 in a fully closed state.
Figure 6:
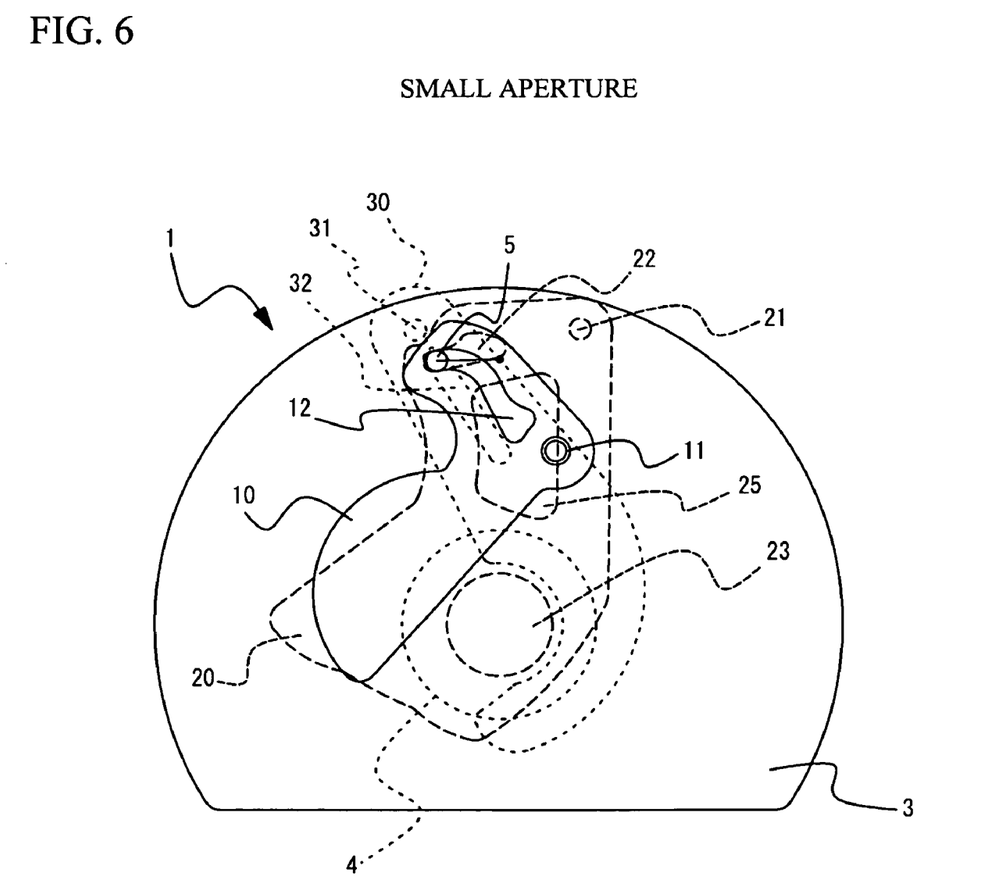
FIG. 6 is a view illustrating the shutter apparatus 1 in a small aperture state.

A description will now be given, with reference to the accompanying drawings, of an embodiment of the present invention. FIG. 1 is a view illustrating a shutter apparatus 1 in a fully open state. FIG. 2A through FIG. 2D respectively show portions of components included in the shutter apparatus shown in FIG. 1. FIG. 3 is a view showing the relationship between a spindle of a first sector (one sector) and other sectors (another sector) in the shutter apparatus shown in FIG. 1. FIG. 4 is a plan view showing a positional relationship between a shutter substrate and a motor in the shutter apparatus 1. FIG. 5 is a view illustrating the shutter apparatus 1 in a fully closed state. FIG. 6 is a view illustrating the shutter apparatus 1 in a small aperture state.

Referring to FIG. 1, the shutter apparatus 1 is configured to have three sectors. The shutter apparatus 1 is provided with a shutter substrate 3 and three sectors 10, 20, and 30. The first sector 10 is a first shutter blade, and the second sector 20 is a small aperture blade having a small aperture opening. The third sector 30 is a second shutter blade. In FIG. 1, for easy understanding of the sectors, the first sector 10 is indicated by a solid line, the second sector 20 by a long-dashed line, and the third sector 30 by a short-dashed line. A shutter opening 4 is provided in the center of the shutter substrate 3.

The first sector 10 is configured swingably around a spindle 11, and has an opening 12. The second sector 20 is configured swingably around a spindle 21, and has an opening 22 and a small aperture opening 23. The third sector 30 is configured swingably around a spindle 31, and has an opening 32. The foregoing three openings 12, 22, and 32 are engaged by a driving pin 5 that serves as an operation member and swings in a circular trajectory by means of a stepping motor (see FIG. 4). That is to say, it is configured in such a manner that one driving pin 5 penetrates the three openings 12, 22, and 32 and all the sectors 10, 20, and 30 are moved to given positions by the movement of the driving pin 5.

Figure 2A:
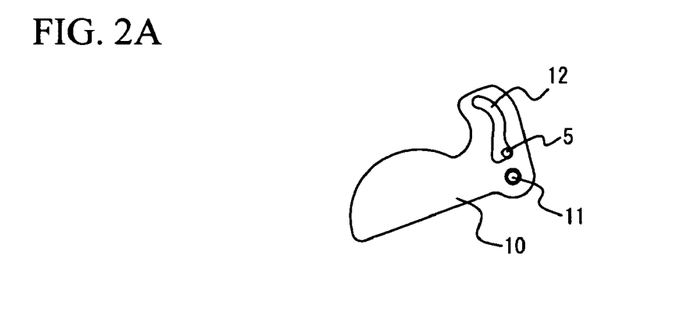
FIGS. 2A, 2B, 2C, and 2D respectively show portions of components included in the shutter apparatus shown in FIG. 1.
Figure 2B:
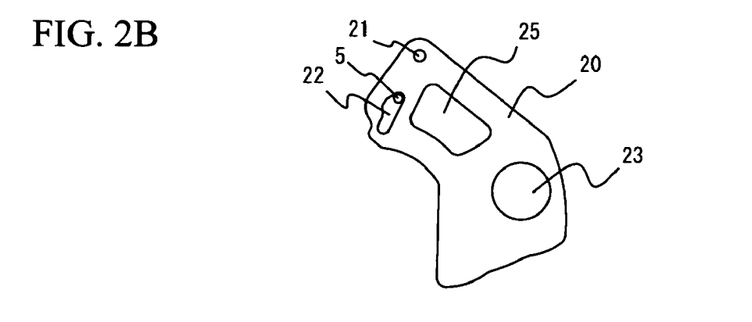
Figure 2C:
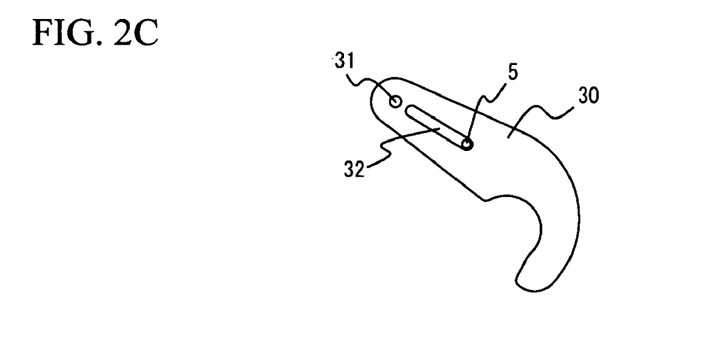
Figure 2D:
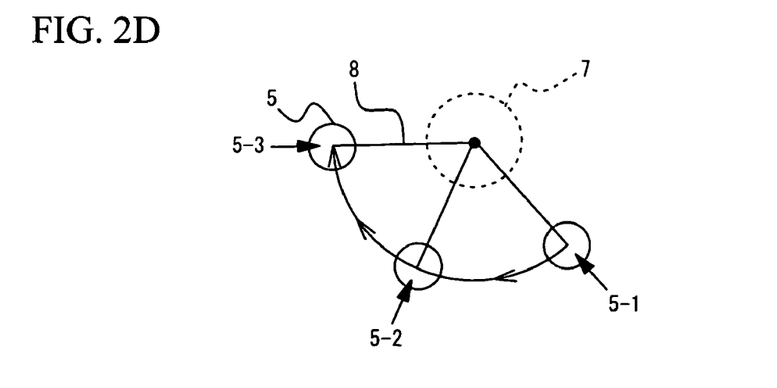

FIG. 2A through FIG. 2D respectively show the portions of components seen in FIG. 1, for facilitate the understanding. FIG. 2A shows the first sector 10, FIG. 2B shows the second sector 20, FIG. 2C shows the third sector 30. FIG. 2D is an enlarged view of a moving range of the driving pin 5 that moves in a circular trajectory. A position 5-1 corresponds to a fully open state. A position 5-2 corresponds to a fully closed state, as will be shown later in FIG. 5. A position 5-3 corresponds to a small aperture state, as will be shown later in FIG. 6. In the shutter apparatus 1, the fully open state, the fully closed state, and the small aperture state are formed by the sectors 10, 20, and 30, while the driving pin 5 is moving in one direction.

In particular, the opening 12 of the first sector 10 and the opening 22 of the second sector 20 respectively have an accelerating region, and enable the drive in no-load state, when the driving pin 5 starts moving from the fully open state shown in FIG. 1. This brings the sufficiently accelerated driving pin 5 to a swinging region to close the shutter opening 4 at high speed. In addition, FIG. 2D illustrates a stepping motor 7 that drives the driving pin 5 and an arm portion 8 that extends from the stepping motor 7. The driving pin 5 is fixed onto the other end of the arm portion 8. Therefore, as a rotor axis of the stepping motor 7 rotates in a given range, the driving pin 5 arranged at the end of the arm portion 8 swings in a circular trajectory, as shown.

FIG. 3 is a side view showing the relationship between the spindle 11 of the first sector 10 and other sectors 20 and 30 in the shutter apparatus 1. In the shutter apparatus 1, the spindle 11 of the first sector 10 is located within a swinging range of the second sector 20 and within that of the third sector 30. Here, the swinging range mentioned now includes the positions in which the sectors 20 and 30 stop to form the fully closed state, the fully open state, or the small aperture state and the regions through which the sectors 20 and 30 pass.

FIG. 3 is an enlarged view of the spindle 11 of the first sector 10 and periphery thereof. The spindle 11 can be integrally formed when the substrate 3 is formed with the use of a resin material. In this case, it is possible to make a pin serve as the spindle 11, the pin being a rod-shaped member provided at a given position of the substrate 3. The first sector 10 is inserted into the spindle 11 to retain the first sector 10 swingably. Since the spindle 11 is made of resin, the head of the spindle 11 is pressed while heating during a thermal caulking process to form a flange part 11a. The flange part 11a formed in this manner prevents the sector 10 from falling off from the spindle (pin) 11. The first sector 10 swings around the spindle 11. The spindle 11 does not extend to a supporting plate 6, is low in overall height, and is formed not to disturb the swings of the sectors 20 and 30.

The spindle 11 shown in FIG. 3 does not interfere with the second sector 20 or the third sector 30, even if the second sector 20 and the third sector 30 swing. It is therefore possible to arrange the spindle 11 in the swinging range of the second sector 20 and in the swinging range of the third sector 30. In this manner, the shutter apparatus 1 can be configured such that the spindle 11 of the sector 10 is located in a desired position, therefore improving the flexibility in the sector design. Consequently, it is possible to arrange the spindle in a place where the spindle cannot be arranged conventionally, thereby enabling the sector design in view of downsizing or assembling efficiency. In addition, the spindle 11 may be fixed onto the substrate 3 by preparing the rod-shaped member, instead of integrally forming with the substrate 3 as described above.

FIG. 4 schematically shows the positional relationship of the shutter substrate 3 and the stepping motor 7 included in the shutter apparatus 1 shown in FIG. 1. The stepping motor 7 is also provided with a rotor 702 and a U-shaped stator 703 on the outside thereof. FIG. 4 shows end sides of the stator 703. Two coils 704 and 705 are wound around the stator 703. The coils 704 and 705 are controlled to dive by a controlling circuit 706.

The shutter substrate 3 is provided with the shutter opening 4 as stated, but is not shown in FIG. 4. The three sectors 10, 20, and 30 are arranged along the substrate surface on a front face side of the shutter substrate 3. These sectors are, from the side of the shutter substrate 3, the first sector 10, the second sector 20, and the third sector 30. The stepping motor 7 is located on the backside of the shutter substrate 3.

The first sector 10 has a spindle opening engaged with the spindle 11 provided on the substrate 3 and an opening engaged with the driving pin 5 connected to a rotor axis 707 of the stepping motor 7, although neither the afore-mentioned spindle opening nor opening is seen in FIG. 4. Also, the second sector 20 has a spindle opening fit with the spindle 21 provided on the substrate 3 and an opening engaged with the driving pin 5. In a similar manner, the third sector 30 has a spindle opening fit with the spindle 31 and an opening engaged with the driving pin 5. In the shutter apparatus 1, the spindle 11 of the first sector 10 is formed by the thermal caulking process to be low in overall height. Meanwhile, the spindle 21 of the second sector 20 and the spindle 31 of the third sector 30 are respectively provided not to overlap the swinging ranges of other sectors in a similar manner as the conventional shutter apparatus. The sectors 10, 20, and 30 respectively swing in their own trajectories, as the driving pin 5 moves.

The arm portion 8 extending in a radial direction is connected to the rotor axis 707 of the stepping motor 7 located on the backside of the substrate 3. The driving pin 5 is connected to the end of the arm portion 8 to extend to an opposite side through a fan-shaped opening 708 provided on the side of the shutter substrate 3. The opening respectively provided on the sectors 10, 20, and 30 are engaged in the driving pin 5 that protrudes on the front side. Accordingly, as the rotor axis 707 of the stepping motor 7 rotates, the driving pin 5 moves in conjunction with the rotation, and in addition, the sectors 10, 20, and 30 swing in given trajectories.

By reference to FIG. 1 (the fully open state), FIG. 5 (the fully closed state), and FIG. 6 (the small aperture state), it is now confirmed the positional relationship between the spindle 11 of the first sector 10 and the second sector 20 and the third sector 30 in the respective states. In the fully open state shown in FIG. 1, the second sector 20 and the third sector 30 stop on the upper side of the spindle 11 of the first sector 11. The second sector 20 and the third sector 30 respectively swing in given trajectories to form the small aperture state from the fully closed state. However, the spindle 11 is low in overall height, and the spindle 11 does not interfere with the sectors 20 and 30. As stated heretofore, the spindle 11 is formed so low in overall height that the sectors can be provided in the shutter apparatus 1 with more flexibility than the conventional one. It is therefore possible to design the sectors to realize downsizing, improved assembling efficiency, or increased shutter speed.

Moreover, the shutter apparatus 1 is configured such that the first sector 10 and the second sector 20 can be operated at high speeds. This is explained. The openings 12 and 22 respectively arranged in the first sector 10 and in the second sector 20 are respectively provided with the accelerating region and the swinging region. Meanwhile, the through-bore 32 of the third sector 30 extends in a direction that crosses a moving direction of the driving pin 5. However, the through-bore 32 has a linear shape that applies a light load onto the driving pin 5. A description is given with reference to FIG. 1 (the fully open state), FIG. 5 (the fully closed state), and FIG. 6 (the small aperture state).

The driving pin 5 is located on a right end of the moving range in the fully open state. At this time, the sectors 10, 20, and 30 are moved to positions that open the shutter opening 4 on the basis of the shapes of the openings 12, 22, and 32. When each of the openings 12 and 22 is focused on, the accelerating region having a circular shape is formed in a direction that the driving pin 5 moves. This is described with reference to FIG. 7.

Figure 7A:
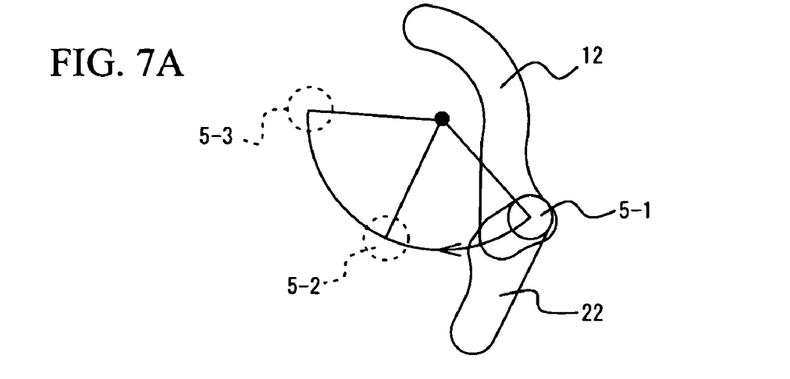
FIGS. 7A, 7B, 7C, and 7D respectively show positional relationships between a opening of the first sector and the opening of the second sector and the driving pin.
Figure 7B:
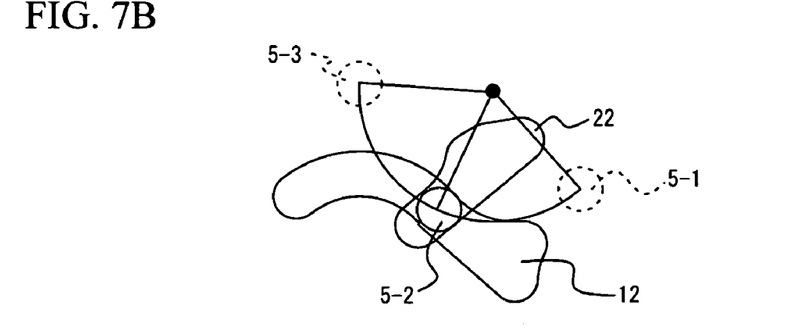
Figure 7C:
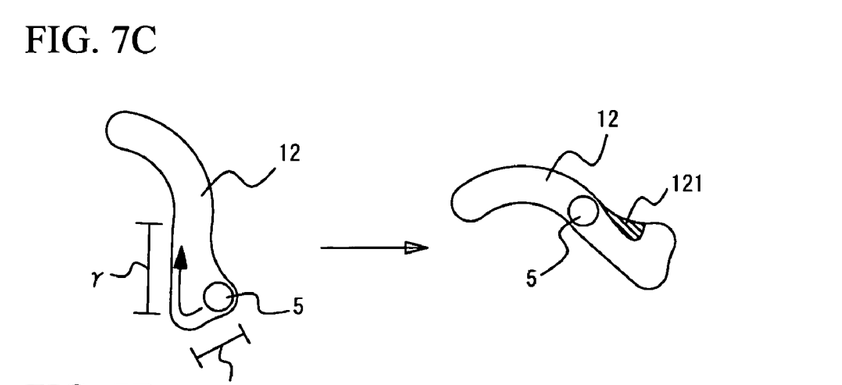
Figure 7D:
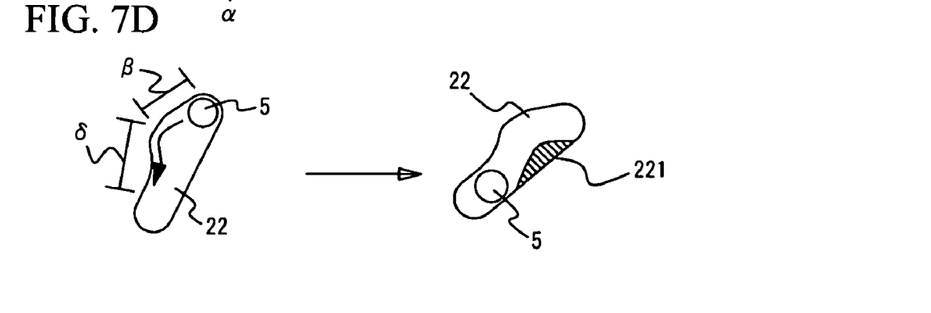

FIG. 7A is an enlarged view of the positional relationship between the opening 12 of the first sector 10 and the opening 22 of the second sector 20 in the fully open state shown in FIG. 1 and the driving pin 5. FIG. 7B is an enlarged view of the positional relationship between the opening 12 of the first sector 10 and the opening 22 of the second sector 20 in the fully closed state shown in FIG. 5 and the driving pin 5. FIG. 7C is a view illustrating a relative position between the opening 12 of the first sector 10 and the driving pin 5 so as to show that their positions are different between the fully open state and the fully closed state. In a similar manner, FIG. 7D is a view illustrating a relative position between the opening 22 of the first sector 20 and the driving pin 5 so as to show that their positions are different between the fully open state and the fully closed state.

The driving pin 5 is located on a right end in the fully closed state shown in FIG. 7A. Both of the opening 12 of the first sector 10 and the opening 22 of the second sector 20 are so formed to have a shape that does not apply the load onto the driving pin 5. In FIG. 7C, a region represented by α is an accelerating region of the opening 12. In FIG. 7D, a region represented by β is an accelerating region of the opening 22. The afore-mentioned accelerating regions are so formed to have a shape that corresponds to a moving trajectory of the driving pin 5. Therefore, the driving pin 5 is capable of starting moving in no-load state from an initial position of the position (5-1).

The driving pin 5 is capable of moving into swinging regions continuously provided with the accelerating regions α and β, with sufficient acceleration. In FIG. 7C, a region represented by γ is a first swinging region of the opening 12, and a region represented by δ is a first swinging region of the opening 22. That is to say, the driving pin 5 follows a path indicated by arrows to move into the first swinging regions γ and δ with sufficient acceleration, as shown in FIG. 7C and FIG. 7D. A cam opening that guides the sectors 10 and 20 to the shutter opening is formed in the first swinging regions γ and δ. It is therefore possible to swing the sectors 10 and 20 at high speeds and change immediately to the fully closed state in FIG. 7B from the fully open sate in FIG. 7A. In addition, the shutter apparatus 1 is also provided with the third sector 30, and the three sectors move in concert in the fully closed state in practice to form the fully closed state shown in FIG. 5.

In a continuous manner with the first swinging regions γ and δ of the openings 12 and 22 of the first sector 10 and the second sector 20, there is further provided a second swinging region to form the small aperture state. A cam opening that swings the first sector 10 and the second sector 20 is formed in the second swinging region to form the small aperture state. Accordingly, when the driving pin 5 moves to the position (5-3) from the position (5-2) shown in FIG. 7B, the small aperture state shown in FIG. 6 is formed. Here, as seen in FIG. 7, the shapes of the openings 12 and 22 that guide the driving pin 5 from the fully closed state to the small aperture state generally have shapes of the cam openings. This is because the shutter speed is not demanded in transition to the small aperture state from the fully closed state.

Furthermore, referring to FIG. 7C and FIG. 7D, a description is given of the path of the driving pin 5 when the driving pin 5 returns to the fully open state from the fully closed state. When the fully closed state shown in FIG. 5 returns to the fully open state shown in FIG. 1, the driving pin 5 returns to the states shown on the right sides to those shown on the left sides in FIG. 7C and FIG. 7D. During the period, the loads applied onto the driving pin 5 are greater in shaded areas 121 and 221 of the openings 12 and 22. Accordingly, in the shutter apparatus 1, the shaded areas 121 and 221 are cut off to enlarge widths of the openings. This enables the driving pin 5 to be reciprocated smoothly.

Moreover, another component is also provided in the shutter apparatus 1 in order to speed up the sector movement. This is described. The second sector 20 shown in FIG. 3(B) is provided with a weight-reduced opening (lightweight opening) 25, in addition to the small aperture opening 23. The weight-reduced opening 25 is formed by cutting out the sector. The weight-reduced opening 25 is formed in a region that does not influence the opening or closing of the shutter opening or the small aperture opening. The weight-reduced opening 25 is formed in the sector 20 so as to reduce the weight and to speed up the movement. In particular, the sector 20 needs a certain area for the small aperture opening 23, and tends to be heavier than other sectors. However, the above-described weight-reduced opening makes it possible to suppress the increase in weight. As a matter of course, a similar weight-reduced opening may be provided in another sector.

As stated heretofore, it is possible to improve the flexibility in the sector design of the shutter apparatus 1, since the spindle 11 of the sector 10 is located in the swinging regions of the sectors 20 and 30. It is therefore possible to downsize the shutter apparatus 1 or improve the assembling efficiency. The shutter speed can also be increased, in a case where the accelerating region and the swinging region are provided in the opening. In addition, the shutter speed can be increased by proving the weight-reduced opening in the sector. With an optical apparatus having the above-described shutter apparatus 1 therein, a sharp image is obtainable.

There is provided a shutter apparatus including a substrate having a shutter opening and at lease two sectors that are supported by spindles swingably and that open and close the shutter opening, wherein a spindle of one sector of the at lease two sectors is located in a swinging range of another sector of the at lease two sectors, and is a pin of a rod-shaped member formed on the substrate to be lower in an overall height than a height in which the another sector swings.

Preferably, the pin has a flange part on a head thereof to prevent any sector of the at lease two sectors from falling off. In addition, the swinging range may include a stopping position and a passing region, the another sector stopping to form a fully closed state, a fully open state, or a small aperture state on the stopping position, and the another sector passing through the passing region.

Furthermore, the above-described shutter apparatus may further include an operation member moves with being connected to an actuator, and each of the at least two sectors may be provided with an opening engaged with the operation member; the opening has an accelerating region and a swinging region; the accelerating region to be provided with the operation member may move in no-load state; the swinging region may be provided continuously with the accelerating region and may have a cam opening; and the cam opening to be provided with the at least two sectors may swing in given trajectories as the operation member moves. Also, the sector may have a weight-reduced opening (lightweight opening) in a region that does not overlap the shutter opening when the sector comes to a position that closes the shutter opening. With the above-described sector being employed, it is possible to improve the shutter speed of the shutter apparatus.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A shutter apparatus comprising a substrate having a shutter opening and spindles, and at least two sectors that are swingably supported by the spindles and that open and close the shutter opening, wherein one spindle, of the spindles, supporting one sector of said at least two sectors is located in a swinging range of another sector of said at least two sectors, and is a pin of a rod-shaped member formed on the substrate to be lower in an overall height than a height in which said another sector swings, wherein the swinging range includes a stopping position and a passing region, said another sector stopping to form a fully closed state or a small aperture state on the stopping position, and said another sector passing through the passing region;

wherein the pin has a flange part on a head thereof to prevent any sector of said at least two sectors from falling off;

an operation member moveably connected to an actuator, wherein each of said at least two sectors is provided with an opening engaged with the operation member;

wherein the opening has an accelerating region and a swinging region;

wherein the operation member moves in the accelerating region in a no-load state;

wherein the swinging region is a continuation of the accelerating region and has a cam opening; and wherein each of the cam openings provided with said at least two sectors swing in respective trajectories as the operation member moves.

2. An optical apparatus having a shutter apparatus comprising a substrate having a shutter opening and spindles, and at least two sectors that are swingably supported by the spindles and that open and close the shutter opening, wherein one spindle, of the spindles, supporting one sector of said at least two sectors is located in a swinging range of another sector of said at least two sectors, and is a pin of a rod-shaped member formed on the substrate to be lower in an overall height than a height in which said another sector swings, wherein the swinging range includes a stopping position and a passing region, said another sector stopping to form a fully closed state or a small aperture state on the stopping position, and said another sector passing through the passing region;

wherein the pin has a flange part on a head thereof to prevent any sector of said at least two sectors from falling off;

an operation member moveably connected to an actuator, wherein each of said at least two sectors is provided with an opening engaged with the operation member;

wherein the opening has an accelerating region and a swinging region;

wherein the operation member moves in the accelerating region in a no-load state;

wherein the swinging region is a continuation of the accelerating region and has a cam opening; and wherein each of the cam openings provided with said at least two sectors swing in respective trajectories as the operation member moves.

* * * * *